United States Patent [19]

Acampora et al.

[11] Patent Number: 5,287,178
[45] Date of Patent: Feb. 15, 1994

[54] RESET CONTROL NETWORK FOR A VIDEO SIGNAL ENCODER

[75] Inventors: Alfonse A. Acampora, Staten Island, N.Y.; Richard M. Bunting, Hamilton Square, N.J.

[73] Assignee: General Electric Company, Princeton, N.J.

[21] Appl. No.: 909,489

[22] Filed: Jul. 6, 1992

[51] Int. Cl.⁵ .......................... H04N 7/12; H04N 5/2; H04N 7/04
[52] U.S. Cl. ..................................... 348/384; 375/25; 375/27; 370/110.1; 348/469
[58] Field of Search ............... 358/133, 141, 135, 136, 358/142, 143, 144, 138, 160, 12, 11; 375/122, 25, 27; 364/725; 371/2; 341/143; 370/118, 109, 110.1, 99; H04N 7/12, 7/00, 7/04, 5/2

[56] References Cited

U.S. PATENT DOCUMENTS

| 5,036,391 | 7/1991 | Auvray et al. | 358/133 |
| 5,111,292 | 5/1992 | Kuriacose et al. | 358/133 |
| 5,122,875 | 6/1992 | Raychaudhari et al. | 358/133 |
| 5,148,272 | 9/1990 | Acampora et al. | 358/141 |

*Primary Examiner*—James J. Groody
*Assistant Examiner*—Michael H. Lee
*Attorney, Agent, or Firm*—Joseph S. Tripoli; Eric P. Herrmann; Ronald H. Kurdyla

[57] ABSTRACT

A video signal encoding system includes a signal processor for segmenting encoded video data into transport blocks having a header section and a packed data section. The system also includes reset control apparatus for releasing resets of system components, after a global system reset, in a prescribed non-simultaneous phased sequence to enable signal processing to commence in the prescribed sequence. The phased reset release sequence begins when valid data is sensed as transiting the data lines.

9 Claims, 5 Drawing Sheets

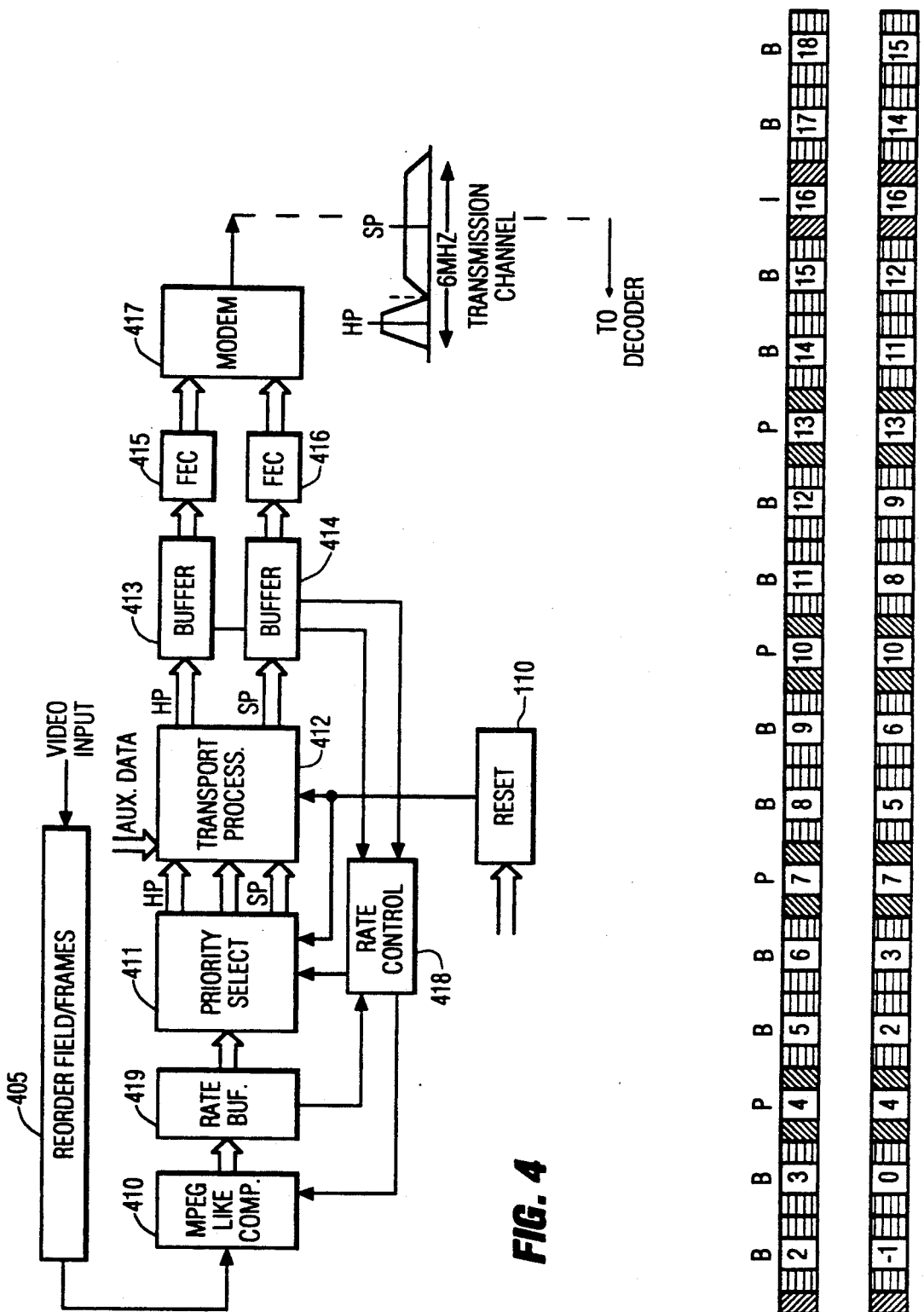
*FIG. 4*
*FIG. 4A*
*FIG. 4B*

RESET CONTROL NETWORK FOR A VIDEO SIGNAL ENCODER

FIELD OF THE INVENTION

This invention concerns apparatus for coding a video signal such as a television signal for example. In particular, this invention concerns apparatus for controlling the resetting function of a segmented data coding system.

BACKGROUND OF THE INVENTION

In the process of coding digital high definition video data for transmission, the video data may be compressed and transmitted in a layered coded format. The layered format may incorporate header data identifying data segments such that, upon loss of data during transmission, a receiver can find an appropriate re-entry point in the received data stream. Extra protection against lost or corrupted data causing confusion or disrupted service at the receiver can be provided by arranging coded video data in transport blocks. The transport blocks include additional header data identifying relatively small portions of the video data. The header data advantageously may include pointers which indicate data re-entry points within respective transport blocks.

The video data may be compressed in a variety of ways, such as in MPEG format or a similar format. MPEG is a standardized coding format being established by the International Organization for Standardization. The standard is described in the document "International Organization for Standardization", ISO/IEC DIS 11172, Coding of Moving Pictures and Associated Audio for Digital Storage Media, Rev. Nov. 23, 1991, which document is incorporated herein by reference for description of the general code format. A system which processes a high definition television signal advantageously using MPEG-like processing and video data transport blocks with associated headers is described in copending U.S. patent application "Apparatus for Segmenting Encoded Video Signal for Transmission", A. A. Acampora et al., Ser. No. 814,207. In that system, a transport processor is used to form data words into data packets which constitute a transport block. The transport processor also generates the required headers, and merges headers with the appropriate transport block.

SUMMARY OF THE INVENTION

It is herein recognized that the process of resetting the transport processor and associated signal processing units deserves careful consideration. Specifically, it is recognized that extraneous signals may be traversing the system while the system is undergoing a (global) reset process. This condition increases the risk of a malfunction in the generation of transport headers and merged transport header/transport block combinations. The disclosed reset control apparatus is directed to assuring, for example, that a header is properly merged with a valid data word rather than with extraneous data or, conversely, that data words are properly merged with a valid associated header rather than with extraneous header bits.

To this end, in accordance with the principles of the present invention, a system for processing segmented coded video data includes reset apparatus which causes signal processing components to exhibit respective reset conditions in a prescribed non-simultaneous sequence. In a disclosed preferred embodiment, the reset apparatus achieves phased, or staggered, release of reset system components after a system reset condition. The phased reset release operation begins when valid data, such as MPEG coded data, is sensed transiting the data lines.

BRIEF DESCRIPTION OF THE DRAWING

FIG. 4 is a block diagram of an HDTV encoding system including apparatus subject to operation according to the present invention.

FIGS. 4a and 4b are pictorial representations of sequences of fields/frames of encoded video signals helpful in understanding the operation of the system shown in FIG. 4.

DETAILED DESCRIPTION

Resetting apparatus according to the present invention will be described in the context of a high definition television (HDTV) coding system employing MPEG-like principles as described in copending U.S. application Ser. No. 814,207 of A. A. Acampora et al., filed Dec. 20, 1991, titled "Apparatus for Segmenting Encoded Video Signal for Transmission". Certain aspects of such system will be shown and discussed in connection with FIGS. 4, 4A, 4B, 5 and 6.

Figure 1:
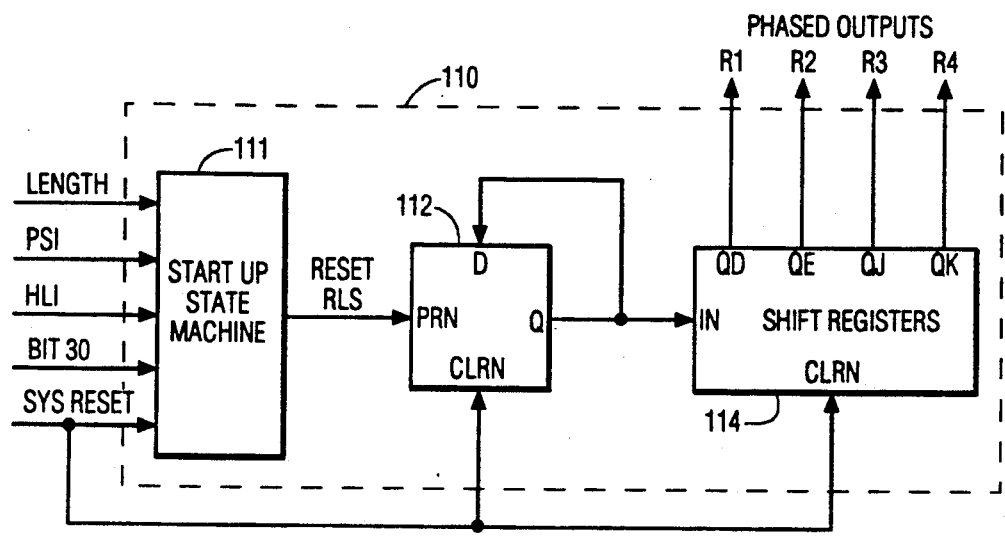
FIG. 1 is a block diagram of resetting apparatus for implementing a reset operation according to the present invention.

In FIG. 1, reset apparatus 110 includes a start-up state machine 111 which responds to plural input signals for developing an output RESET RLS (reset release) signal to a D flip-flop 112, which provides a signal to an input (IN) of a shift register unit 114. The system (global) reset sequence begins when a system reset signal SYS RESET appears. This signal initializes state machine 111, and clears both flip-flop 112 and shift register unit 114. Cleared unit 114 provides logic low signals at its four Q outputs, QD, QE, QJ and QK. These are provided as signals R1, R2, R3 and R4 to reset inputs of system components as will be seen in FIG. 3. Initially, these logic low signals reset the system components to which they are respectively coupled. Flip-flop 112 maintains this reset state, whereby the Q outputs of unit 114 remain at a logic low (reset) state, until state machine 111 provides reset release output signal RESET RLS in response to certain characteristics of the plural input signals applied to state machine 111.

Specifically, state machine 111 is programmed to respond to a prescribed sequence of input signals LENGTH, PSI, HLI and BIT 30 after being initialized, as well as signals PSC, TREF, PCT and BF whose bit lengths are indicated by the LENGTH signal. These signals are generated in accordance with MPEG coding procedures and one provided by the MPEG video signal compression hardware. LENGTH is a parallel word coincident with variable length codewords for indicating the bit lengths of those codewords. PSI, a Picture Start Indicator, is a 1-bit logic high flag valid for the one clock period that a Picture Start Codeword (e.g., for an I frame, P frame or B frame as will be seen in FIG. 5) is present on the variable length codeword bus. Signal HLI is a high/low priority indicator which when logic high indicates the presence of high priority data in the codeword stream to be processed by a high priority processor, for the duration of the logic high. Conversely, a logic low for signal HLI indicates the presence of low priority data to be processed by a low priority processor, for the duration of the logic low. In this disclosure low priority is synonymous with standard priority. BIT 30 in a 32-bit MPEG variable length coded data word is used to identify the beginning of an I-frame, which is significant in that it begins a group of pictures. Signal TREF is an MPEG temporal reference, an unsigned integer assigned in sequence to the input pictures in display order, which allows a decoder to rearrange image fields/frames from their transmission order back to the original order (i.e., re-ordering the FIG. 4B field/frame format to the original FIG. 4A format). PSC is the MPEG Picture Start Code which signals a decoder that the ensuing data comprises an image frame. PCT is the Picture Coding Type which allows the decoder to identify a picture as an Intra coded picture (I), a Predictive coded picture (P), or a bidirectionally predictive coded picture (B). BF is the MPEG Buffer Fullness codeword (synonymous with the current terminology: virtual buffer verification delay) used to set the initial occupancy of the decoder's buffer at the start of decoding so that the buffer does not overflow or underflow.

Figure 2A:
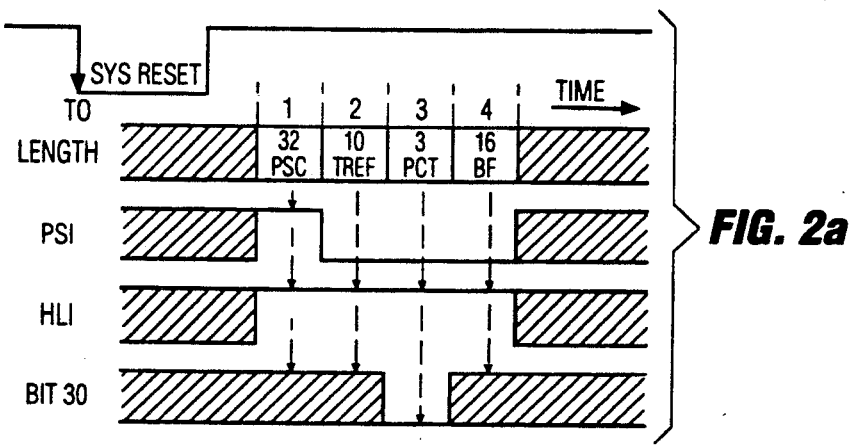
FIGS. 2a and 2b depict timing diagrams of signal sequences illustrating the operation of apparatus according to the present invention.

The reset release output signal from state machine 111 appears when state machine 111 detects the signal sequence illustrated in FIG. 2a over four clock cycles. During the first of these clock cycles, the LENGTH signal indicates the presence of a 32-bit Picture Start Code (PSC). At the same time, there appears a Picture Start Code Indicator (PSI), a High Priority Indicator (high logic level HLI), and an arbitrary Bit 30 logic value. During the second clock cycle the LENGTH signal indicates the presence of a 10-bit Temporal Reference (TR), accompanied by a High Priority Indicator (high logic level HLI signal) and an arbitrary Bit 30 logic value. In the next clock cycle the LENGTH signal indicates the presence of a 3-bit Picture Code Type (PCT) signal. This is accompanied by a High Priority Indicator and a Bit 30 low logic value. In the fourth and last clock cycle of this sequence the LENGTH signal indicates the presence of a 16-bit Buffer Fullness (BF) signal, which is accompanied by a High Priority Indicator and an arbitrary Bit 30 logic level. When this sequence of four signals is sensed, the RESET RLS signal is generated by state machine 111, whereby the output of flip-flop 112 is placed in a logic high state. This logic high state causes the Q outputs of unit 114 to change state, in succession, from the pre-existing logic low reset state to a logic high reset release state. The reset release states are timed to appear sequentially at the Q outputs of shift register 114, in a phased or staggered sequence, as a function of system characteristics and requirements such as clock delays between system components. The interval between the reset release states exhibited by signals R1, R2, R3 and R4 is determined by the spacing of the shift register Q output taps. The described reset/reset release process is initiated in response to the initial (falling) edge of the SYS RESET pulse (FIG. 2a), which occurs at a time T0. This reset/release process does not begin until a Group of Pictures sequence begins. Signals PSC, TREF, PCT and BF, where the PCT specifically indicates an intra coded frame, recur with every Group of Pictures.

The signal sequence shown in FIG. 2a is significant in that it indicates the presence of an I-frame within a Group of Pictures. An I-frame represents a coded actual (non-predicted) image at the beginning of a group of picture frames as will be seen from FIGS. 4a, 4b and 5. Thus the presence of I-frame data is chosen as the representative valid data with which to begin the reset release process. The beginning of an I-frame is unambiguously indicated by BIT 30 of a 32 bit MPEG variable length coded (VLC) data word. Bits 29, 30 and 31 of such MPEG coded data words define Picture Coding Type data indicative of I, P or B frames. For I, P and B frames these bits respectively exhibit binary values 100, 010 and 110.

In this example the sequence of variable length coded data words PSC, TREF, PCT and BF in FIG. 2a is continuous, e.g., there are no intervening zero lengths between these words. This is not essential, however, since intervening zero lengths can be tolerated. For example, in the given example the state machine begins a search sequence for the reset operation beginning with the acquisition of a Picture Start Codeword. More robustness may be achieved by beginning the search sequence with an MPEG Group of Pictures start codeword.

Figure 2B:
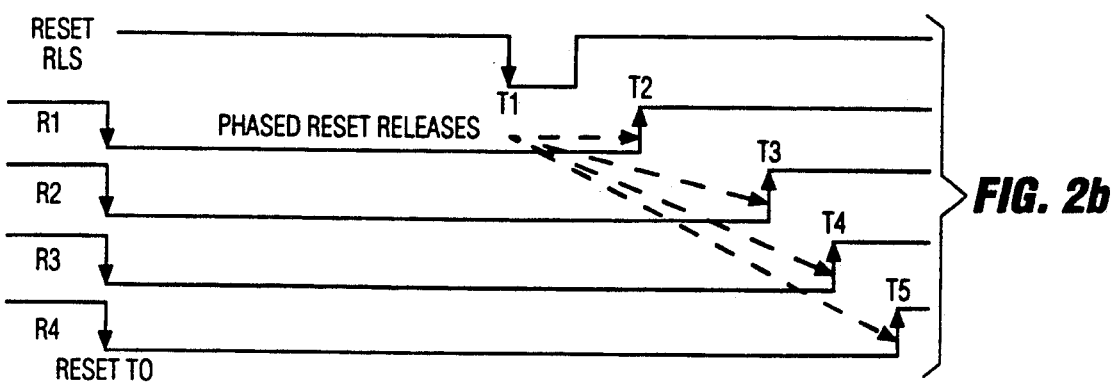

The timing of the reset/reset release operation is illustrated by the waveforms of FIG. 2b. Each of reset control signals R1, R2, R3 and R4 simultaneously exhibit a logic low reset state at time T0, when shift register 114 is cleared in response to the SYS RESET signal. Subsequently, at time T1, state machine 111 generates the RESET RLS signal (falling edge transition). Afterwards, signals R1-R4 sequentially exhibit logic high reset release states at times T2, T3, T4 and T5 respectively (rising edge transition), which permits associated signal processing components to commence operation in a proper sequence for properly generating transport blocks as will be seen from FIG. 3.

In this example the first reset release (R1) at time T2 occurs five clock cycles after the RESET RLS control signal appears at time T1. This delay assures that all signal components sensed by state machine 111 are in their respective data buses waiting to be processed. Reset release R2 is delayed one clock cycle relative to reset release R1 (T3-T2), reset release R3 is delayed five clock cycles relative to reset release R2 (T4-T3), and reset release R4 is delayed one clock cycle relative to reset release R3 (T5-T4).

Figure 3:
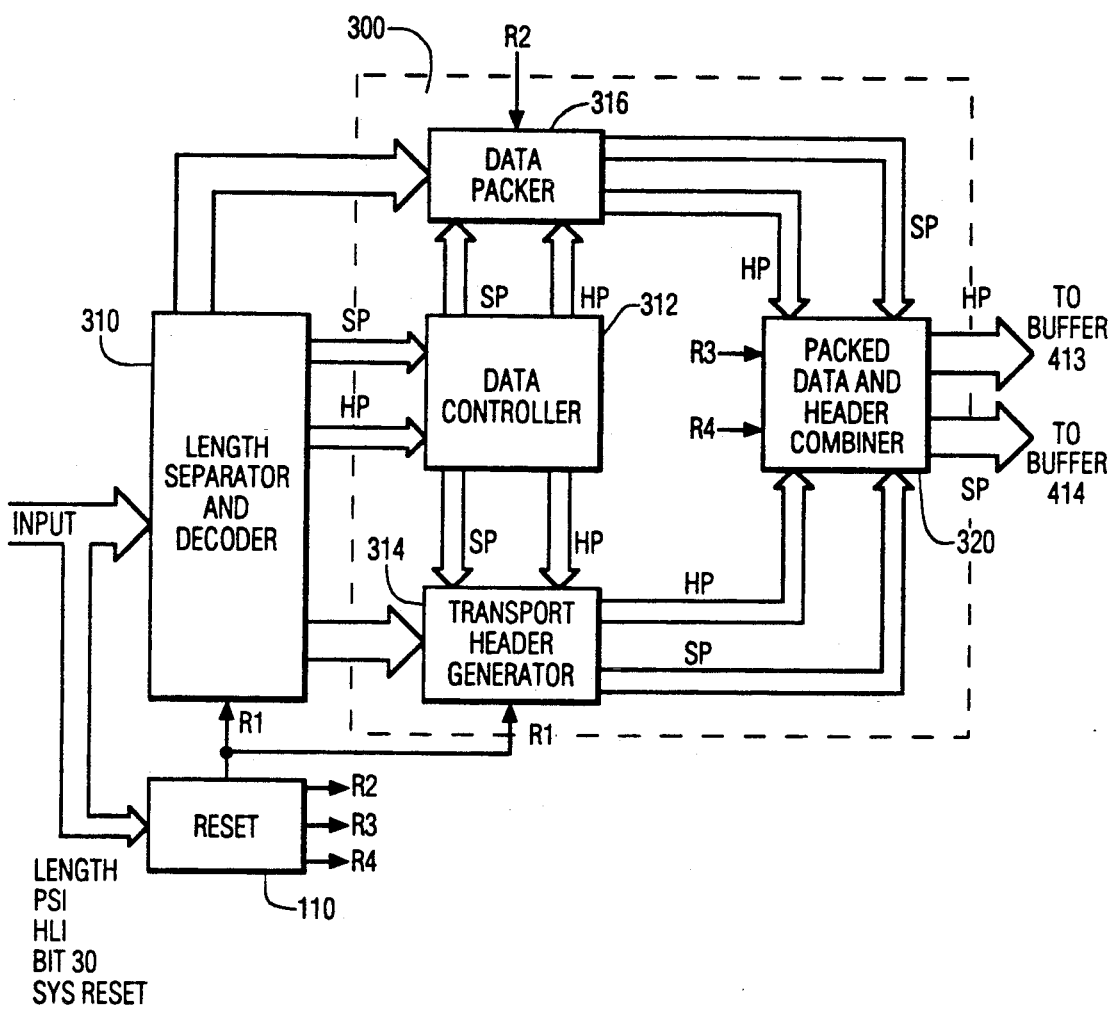
FIG. 3 is a block diagram of a portion of a system for processing segmented coded video data, subject to being reset according to the principles of the present invention.

FIG. 3 illustrates portions of a transport processor 300 (e.g., unit 412 in FIG. 4) for processing variable length coded HDTV video data, a reset control unit 110 as described with respect to FIG. 1, and a length separator and decoder unit 310. Unit 310 may be included in a priority select unit 411 in the system of FIG. 4. INPUT data includes a plurality of data components such as MPEG Variable Length Codewords and the signals discussed in connection with FIG. 2a, among others. Output data from unit 310 including Variable Length Codewords (VLCS) is provided to a data packer 316. Another group of output data provided to Data Controller 312 from unit 310 includes data concerning the lengths of high priority (HP) and standard priority (SP) variable length codewords, and data indicating the beginning of respective high and standard priority data. A further group of data, provided to transport header generator 314 from unit 310, includes frame type identifying information, motion vectors, and picture start, record header and macroblock indicators.

Controller 312 tracks the accumulation of word length data to ascertain the completion of 32-bit data words, and the completion of 960-bit data packets (30 words per data packet). Word addresses are passed to data packer 316 to insure proper concatenation of VLCs applied to packer 316. Controller 312 also tracks the completion of high and standard priority packets. The bit and word counting process is initialized by the appearance of a Group of Pictures Start Indicator, which resets accumulators in controller 312 and packer 316. Controller 312 also provides high priority and standard priority control data to header generator 314. This data includes information relating to the bit position within a packet of the first appearance of high and standard priority data respectively, in response to high and standard priority indicators applied to controller 312. This data is presented to header generator 314 as entry points for aligning header and transport block packed data.

Variable length codewords applied to data packer 316 from unit 310 on a 32-bit bus are processed by packer 316 into respective 32 bit high priority words and standard priority words under the supervision of control signals from controller 312. Concatenation is arranged to accommodate the eventual MPEG serial transmission order, and the packed data from unit 316 is sent at a variable word rate to packed data and header combiner 320. A data packet begins when a Group Start indicator is present in the input signal. Subsequent packets are segmented from the data in the GOP. All such packets are typically complete when 30 packed words have been transmitted.

Transport header generator 314 monitors the completion of high priority and standard priority packets via a bit accumulation process initialized by the appearance of a Group Start indicator, which resets accumulators within controller 312. Formation of transport headers requires knowledge of a Record Header Indicator used for slice counting, a Macroblock Address Increment Indicator used for macroblock counting, a Picture Start Indicator used for frame counting, and entry points for high and standard priority data as determined during packet formation. Image slices, macroblocks and frames will be discussed in connection with FIG. 5. The transport header data for both high and standard priority data is conveyed to combiner 320 when an entry point is established for a data packet.

Packed data words are conveyed from packer 316 to a FIFO storage unit in combiner 320 whenever the words are available. Similarly, the transport headers are conveyed from header generator 314 to a FIFO storage unit in combiner 320 whenever the headers are available. In the case of a typical 30 word data packet, after 30 data words have been conveyed the Last Word signal will cause combiner 320 to acquire the associated header. The transport headers are transmitted to rate buffers (units 413 and 414 in FIG. 4) ahead of the data packet described by the header. HP and SP processors in combiner 320 each include a data FIFO, a header FIFO and an associated time multiplexer (MUX). The MUX selects the header from the header FIFO, and conveys the header to the buffer before the associated data is selected from the data FIFO and conveyed to the buffer.

The reset condition of the apparatus shown in FIG. 3 is controlled by output signals R1–R4 from a reset control unit 110, which was described in connection with FIGS. 1 and 2. The input SYS RESET signal applied to reset unit 110 may be developed in response to a manual condition, or automatically such as when the system is initially energized or when an error is detected. Among the reset/release operations enabled by control signals R1–R4 are the following. Reset control signal R1 as applied to unit 310 causes resettable elements such as flip-flops to exhibit a desired initial state. Control signal R1 as applied to header generator 314 initializes frame, slice and macroblock counters, and releases circuits to enable writing and reading of header data. Control signal R2 as applied to data packer 316 resets a barrel shifter addressing circuit used for packing data words in a proper sequence, and for releasing circuits which allow writing of packed data. Control signal R3 as applied to combiner 320 holds associated transport header FIFOs in a cleared state until released to operate. Control signal R4 performs a similar function with respect to the data FIFOs in combiner 320. As can be seen from FIG. 2b, the header FIFO is released via signal R3 before the data FIFO is released via signal R4. The reset release sequence implemented by control signals R1–R4 assures that a given header is properly associated with the packed data it identifies. Specifically, the transport header generator is initialized, headers are written, data addresses are reset permitting packed data in a proper sequence, the packed data is written, and packed data FIFOs are released after the header FIFOs are released to assure that the header is ready for the data which follows. Thus the reset/reset release operation enables a desired signal processing sequence for transport block header/data formation.

Figure 7:
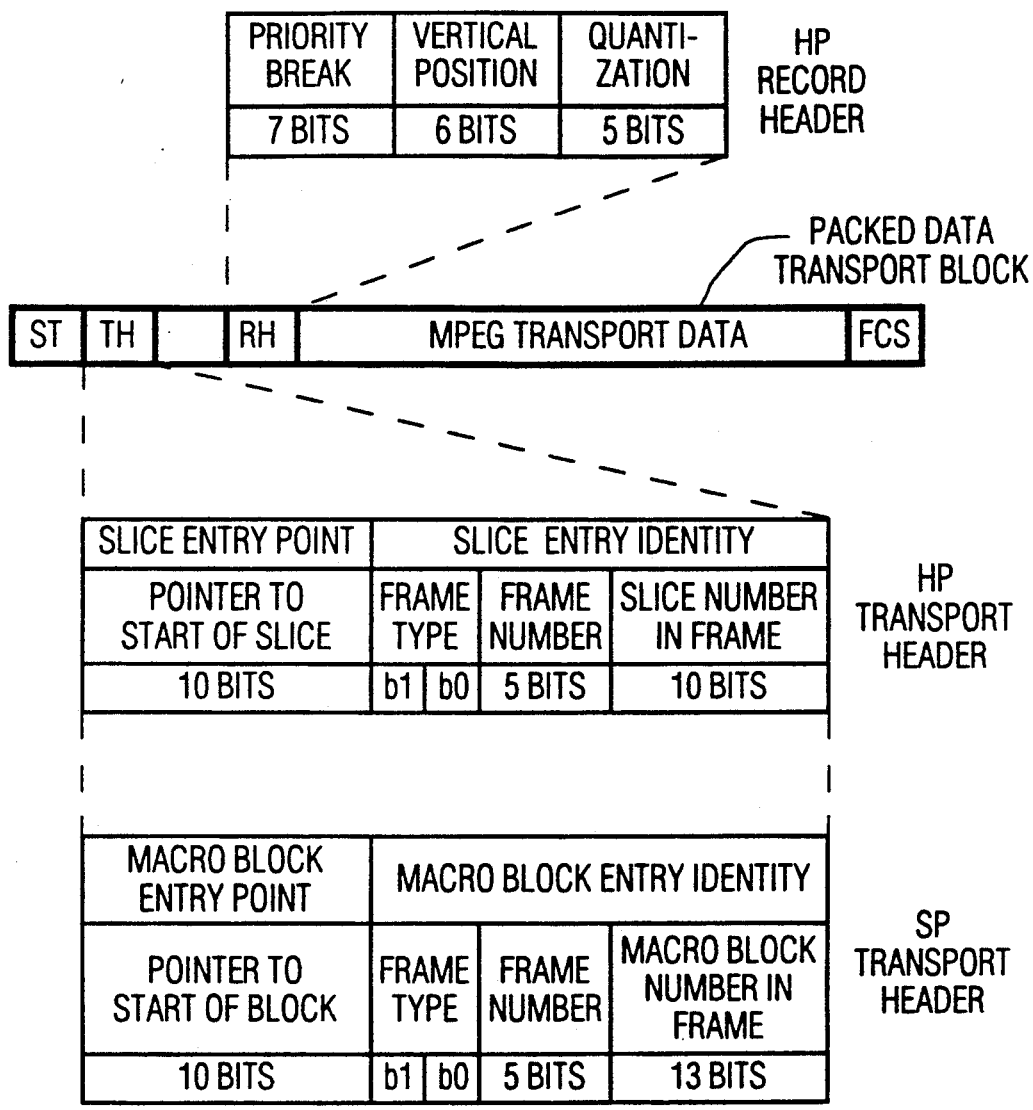
FIG. 7 is a generalized pictorial representation of a transport data block.

The sequence of reset/releases is further explained by a brief examination of the Transport Block of FIG. 7. Specifically, the transport headers have a section reserved for entry identification, and a section reserved for the pointer to a specific packed codeword within the transport packet. The entry identification relates to the temporal and spatial aspects of the data within a transport cell. The pointer is formed whenever specific codewords are about to the packed. Therefore, it is possible that such a special codeword is to be packed at the beginning (start) of the transport cell, but is of insufficient length to fill out the first 32 bit data word. Thus, a header is created before any data word and so it must be recorded first. If the special codeword occurs well after one or more data words have been issued, thus providing for data words in advance of the header, such words are buffered in a data word FIFO until the header is formed. However, to guard against the earlier case, header circuitry must be released first. Additionally, since the entry pointer is formed as codewords appear at the data packers, the headers must be released first.

An exemplary HDTV signal processing system which may employ the present invention processes a two-to-one interlaced signal of 1050 lines at 59.94 frames per second. The nominal active picture has 960 lines of 1440 pixels each with an aspect ratio of 16×9.

The signal is transmitted using two 32-QAM (quadrature amplitude modulated) carriers frequency multiplexed in a 6 MHz transmission band. The nominal total bit rate, including video, audio and auxiliary data, is 26-29 Mbps.

The video signal is initially compressed in conformance with an MPEG-like format. Thereafter MPEG-type signal codewords are parsed into two bit streams in accordance with the relative importance of the respective codeword types. The two bit streams are independently processed to apply error correction overhead bits, and then QAM modulate respective carriers which are combined for transmission. The bit streams of relatively greater and lesser importance are designated high priority (HP) and relatively lower standard priority (SP) channels respectively. The high priority channel is transmitted with approximately twice the power of the standard priority channel. The high priority/standard priority information ratio is approximately one-to-four.

FIG. 4 illustrates an exemplary HDTV encoding/decoding system employing apparatus according to the invention. FIG. 4 shows the system processing a single video input signal, but it is to be understood that the luminance and chrominance components are processed separately, and that luminance motion vectors are used for generating compressed chrominance components. The compressed luminance and chrominance components are interleaved to form macroblocks before codeword priority parsing.

A sequence of image fields/frames shown in FIG. 4A is applied to circuitry 405 which reorders the fields/frames according to FIG. 4B. The reordered sequence is applied to a compressor 410 which generates a compressed sequence of frames that are coded according to an MPEG-like format. This format is hierarchical and is illustrated in abbreviated form in FIG. 6.

The MPEG hierarchical format includes a plurality of layers each with respective header information. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required. The respective layers of the coded video signal are illustrated pictorially in FIG. 5.

When referring to the MPEG-like signal produced by the system, what is meant is that (a) successive picture fields/frames of video signals are encoded according to an I, P, B coding sequence, and (b) coded data at the picture level is encoded in MPEG-like slices or group of blocks, where the number of slices per field/frame may differ and the number of macro blocks per slice may differ. An I coded frame is one which is intraframe compressed such that only I frame compressed data is required to reproduce an image. P coded frames are coded according to a forward motion compensated predictive method, that is the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

Figure 6:
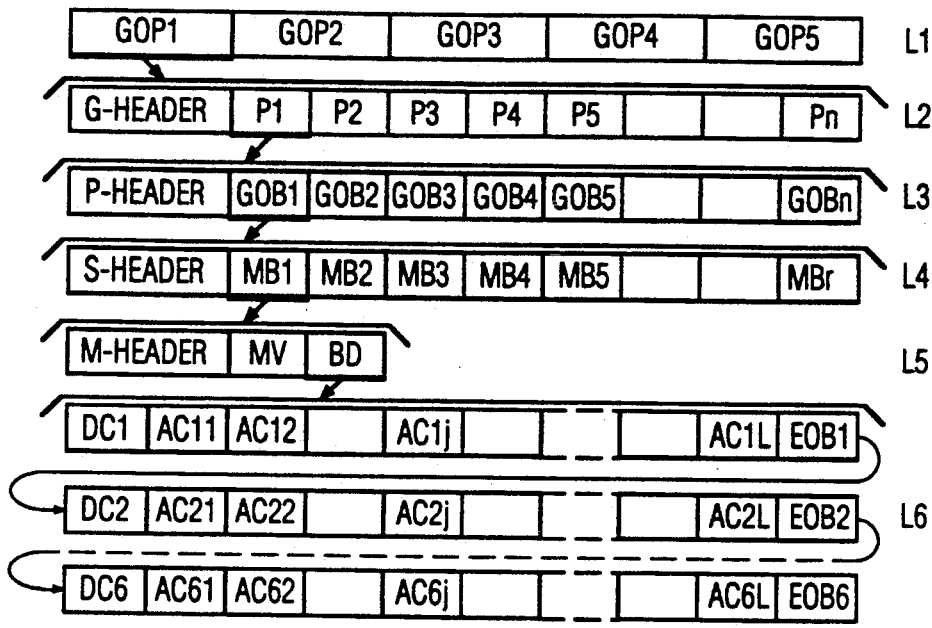
FIG. 6 is a generalized pictorial representation of the data format provided by the compression apparatus in the system of FIG. 4.
Figure 5:
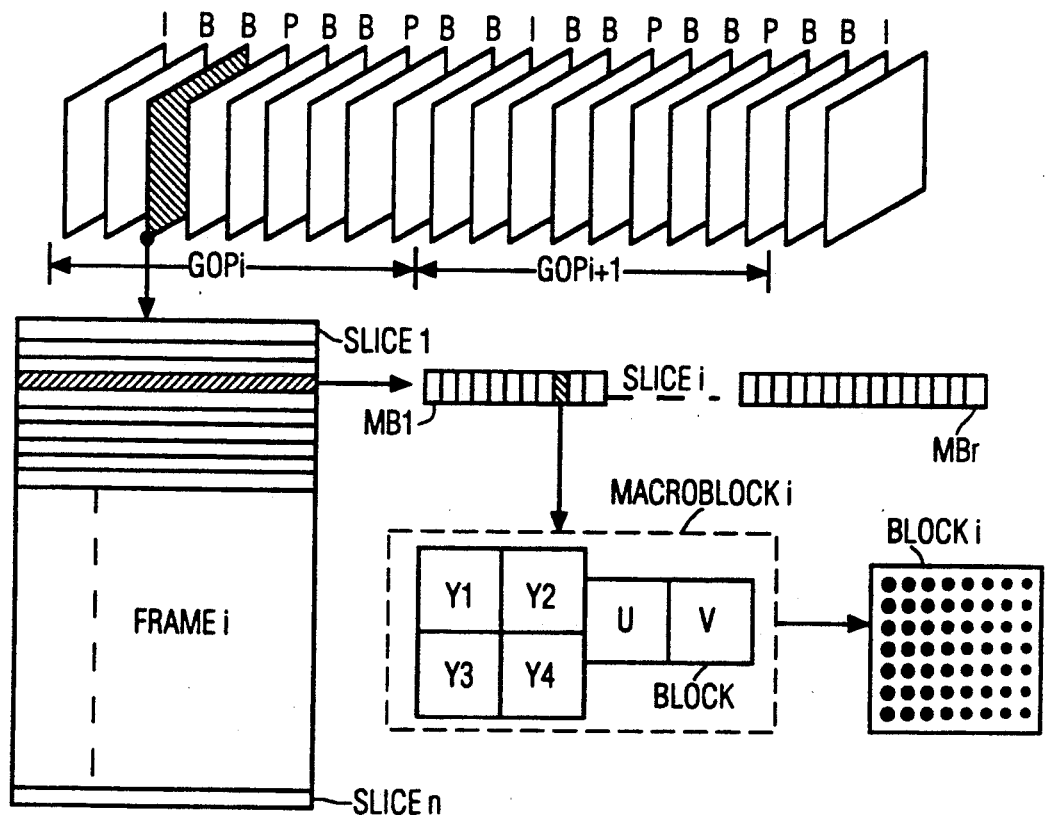
FIG. 5 is a pictorial representation of datablock generation developed by compression apparatus in the system of FIG. 4.

The coded output signal of the present system is segmented in groups of fields/frames, or groups of pictures (GOP) illustrated by the row of boxes L2 (FIG. 6). Each GOP (L2) includes a header followed by segments of picture data. The GOP header includes data related to the horizontal and vertical picture size, the aspect ratio, the field/frame rate, the bit rate, etc.

The picture data (L3) corresponding to respective picture fields/frames includes a picture header followed by slice data (L4). The picture header includes a field/frame number and a picture code type. Each slice (L4) includes a slice header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Each macroblock includes 6 blocks, including four luminance blocks, one U chrominance block and one V chrominance block. See FIG. 5. A block represents a matrix of pixels, e.g., $8 \times 8$, over which a discrete cosine transform (DCT) is performed. The four luminance blocks are a $2 \times 2$ matrix of contiguous luminance blocks representing, e.g., a $16 \times 16$ pixel matrix. The chrominance (U and V) blocks represent the same total area as the four luminance blocks. That is, before compression the chrominance signal is subsampled by a factor of two horizontally and vertically relative to luminance. A slice of data corresponds to data representing a rectangular portion of an image corresponding to an area represented by a contiguous group of macroblocks. A frame may include a raster scan of 360 slices, 60 slices vertically by 6 slices horizontally.

The block coefficients are provided one block at a time with the DCT. The DC coefficient occurs first followed by respective DCT AC coefficients in the order of their relative importance. An end of block code EOB is appended at the end of each successively occurring block of data.

The amount of data provided by compressor 410 is determined by rate control element 418. As is well known, compressed video data occurs at variable rates, and data is desirably transmitted at a constant rate equivalent to the channel capacity, to realize efficient use of the channel. Rate buffers 413 and 414 perform the variable to constant data rate translation. It is also known to adjust the amount of data provided by the compressor in accordance with the level of occupancy of the buffers. Thus the buffers 413 and 414 include circuitry to indicate their respective level of occupancy. These indications are applied to rate controller 418 to adjust the average data rate provided by compressor 410. The adjustment is typically accomplished by adjusting the quantization applied to the DCT coefficients. Quantization levels may be different for the different types of frame compression.

Compressed video data hierarchically formatted as indicated in FIG. 6 is coupled to a priority select element 411, which includes means (e.g., unit 310 in FIG. 3) for parsing the coded data between a high priority channel HP and a standard priority channel SP. High priority information is that information the loss or corruption of which would create the greatest degradation in reproduced images. Stated conversely, it is the least data needed to create an image, albeit less than a perfect image. Standard priority information is the remaining information. The high priority information includes substantially all of the header information included in the different hierarchical levels plus the DC coefficients of the respective blocks and a portion of the AC coefficients of the respective blocks (level 6, FIG. 6).

The ratio of HP and SP data at the transmitter is approximately 1:4. At the transport processor auxiliary data is added to the signal to be transmitted. This auxiliary signal may include digital audio and teletext data for example. The average amount of the auxiliary data included in the HP channel is calculated and compared to the expected statistical average of the compressed video information. From this the ratio of high and standard priority compressed video information is calculated. Priority select unit 411 parses the data provided by compressor 410 according to this ratio.

The HP and SP compressed video data are coupled to a transport processor 412, which may include apparatus such as unit 300 in FIG. 3. Transport processor 412 (a) segments the HP and SP data streams into transport blocks, (b) performs a parity or cyclic redundancy check on each transport block and appends the appropriate parity check bits thereto, and (c) multiplexes the auxiliary data with the HP or SP video data. The parity check bits are utilized by the receiver for isolating errors in conjunction with synchronizing header information and for providing error concealment in the event of uncorrectable bit errors in the received data. Each transport block includes a header including information indicative of the type of information included in the block, e.g., video audio and pointers to the starting points of contiguous like data. Reset control unit 110 provides reset control signals to transport processor 412 as previously discussed.

The HP and SP data streams from transport processor 412 are applied to the respective rate buffers 413 and 414, which convert the variable rate compressed video data from processor 412 to data occurring at a substantially constant rate. The rate adjusted HP and SP data are coupled to forward error coding (FEC) elements 415 and 416 which (a) perform REED SOLOMON forward error correction encoding independently to the respective data streams; (b) interleave blocks of data to preclude large error bursts from corrupting a large contiguous area of a reproduced image; and (c) appends codes, e.g., Barker codes, to the data for synchronizing the data stream at the receiver. Thereafter the signals are coupled to a transmission modem 417 wherein the HP channel data quadrature amplitude modulates a first carrier and the SP channel data quadrature amplitude modulates a second carrier displaced from the first carrier by approximately 2.88 MHz. The 6 dB bandwidth of the modulated first and second carriers are respectively about 0.96 MHz and 3.84 MHz. The modulated first carrier is transmitted with approximately 9 dB greater power than the modulated second carrier. Since the HP information is transmitted with greater power it is much less prone to corruption by the transmission channel. The HP carrier is located in the portion of the frequency spectrum of an, e.g., NTSC TV, transmission channel normally occupied by the vestigial sideband of a standard NTSC TV signal. This portion of the signal channel is normally significantly attenuated by the Nyquist filters of standard receivers and thus HDTV signals with this transmission format will not introduce cochannel interference.

At a receiver decoder (not shown) the transmitted signal is detected by a modem which provides two signals corresponding to the HP and SP channel signals. These two signals are applied to respective REED SOLOMON error correcting decoders. Error corrected signals are coupled to rate buffers which receive data at a variable rate according to the requirements of subsequent decompression circuitry. The variable rate HP and SP data are applied to a transport processor which performs the inverse of the operation performed by processor 412 at the encoder. It also performs a degree of error detection responsive to the parity check bits included in the respective transport blocks. The transport processor provides separated auxiliary data, HP data, SP data and an error signal. The latter three signals are coupled to a priority deselect processor which reformats the HP and SP data into an hierarchically layered signal which is applied to a decompressor which performs the inverse function of the compressor at the encoder. Additional details of apparatus which may be used for compressor 410, priority selector 411 and transport processor 412 of FIG. 4 are found in previously mentioned copending U.S. patent application Ser. No. 814,207.

FIG. 7 shows details of a simplified exemplary transport block. The transport block begins with a service type (ST) block, e.g., 3 bits, for identifying video, audio or other data being conveyed. The service block is followed by a transport header (TH) and the MPEG transport packed data. A record header RH may or may not occur within the block. Each transport block is terminated by a 16-bit frame check sequence (FCS), which is calculated over all bits in the transport block. The FCS may be generated using a cyclic redundancy code.

High priority (HP) and standard priority (SP) transport headers are shown. The HP header contains a 10-bit pointer to the start of a slice, 2-bit frame type identifier data, a 5-bit frame number identifier, and a 10-bit segment indicating the number of a slice in a frame (see FIG. 5). The initial 10-bit segment points to the first bit of the entry point in the transport data. Frame type bits b1, b0 can assume binary values of 00, 01, 10 and 11 for respectively designating an I-frame slice zero entry point, a slice in an I-frame other than a slice zero entry point, a P frame and a B frame (see FIG. 5). The frame number segment identifies frames 0–31, and the 10-bit slice number segment designates slices 1–360, with slice 0 being the picture header.

In the standard priority (SP) header, the initial 10-bit segment points to the first bit of a macroblock that is identified by the frame type, frame number and macroblock number. The latter is a 13-bit segment indicating the number of a macroblock within a given frame, e.g., macroblocks 0–4679 (60 blocks vertically×78 blocks horizontally).

The HP transport block may include none, one or more than one record header (RH). Record header positions are variable within the transport block, and a record header occurs at the beginning of each slice of macroblock data. The illustrated HP record header includes Priority Break data, which indicates the number of codewords which must be decoded before commencing SP processing; Vertical Position data which forms part of the MPEG slice start code; and Quantization data, which indicates the slice quantization level.

What is claimed is:

1. A video signal encoding system comprising:
    means responsive to a video signal for providing encoded video signal data;

signal processing means, including a plurality of signal processing components, responsive to said encoded video data for providing segmented transport blocks of video data comprising groups of packed data and headers identifying associated ones of said groups, said components subject to exhibiting a reset condition wherein normal signal processing operation is inhibited, and exhibiting said normal operation when said reset condition is released; and resetting means coupled to said signal processing means for causing certain ones of said components to exhibit said reset condition; wherein said resetting means releases said certain components from said reset condition in a prescribed non-simultaneous sequence such that said certain components are uninhibited in said prescribed non-simultaneous sequence, respectively, to thereby exhibit normal operation in said non-simultaneous sequence.

2. Apparatus according to claim 1, wherein said resetting means releases said reset condition in response to the appearance of image representative data.

3. Apparatus according to claim 2, wherein said image data represents intraframe image data which alone is sufficient to produce an image.

4. Apparatus according to claim 1, wherein said resetting means resets said certain components simultaneously, and releases said reset condition in said prescribed sequence to enable signal processing to commence in said prescribed sequence.

5. Apparatus according to claim 1, wherein said certain components of said signal processing means comprises:

data means responsive to encoded video data for providing groups of packed video data;

header means for generating transport headers identifying associated ones of said groups of packed video data; and means for combining a transport header with an associated packed data group to produce a transport block.

6. Apparatus according to claim 5, wherein a reset condition of said header means is released before a reset condition of said data means is released whereby said header means is uninhibited to allow normal operation before said data means; and a reset condition of said data means is released before a reset condition of said combining means is released whereby said data means is uninhibited to allow normal operation before said combining means.

7. Apparatus according to claim 6, wherein said resetting means provides a first control signal to said header means, a second control signal to said data means, and third and fourth control signals to said combining means;

said combining means includes first storage means for receiving said headers, and second storage means for receiving packed data groups; and means for conveying header data from said first storage means and packed data from said second storage means to an output; wherein said first storage means is released from a reset condition prior to said second storage means whereby said first storage means is uninhibited to allow normal operation before said second storage means.

8. Apparatus according to claim 7, wherein said first, second, third and fourth control signals release a reset condition in the order named.

9. Apparatus according to claim 1, wherein said video signal is a video signal component of a high definition television signal.

* * * * *